United States Patent
Onoue et al.

(10) Patent No.: US 10,008,329 B2
(45) Date of Patent: Jun. 26, 2018

(54) MULTILAYER CAPACITOR HAVING FIRST INTERNAL ELECTRODES AND SECOND INTERNAL ELECTRODES ALTERNATELY DISPOSED

(71) Applicant: TDK CORPORATION, Tokyo (JP)

(72) Inventors: Toru Onoue, Tokyo (JP); Ken Morita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 73 days.

(21) Appl. No.: 14/995,692

(22) Filed: Jan. 14, 2016

(65) Prior Publication Data

US 2016/0217927 A1    Jul. 28, 2016

(30) Foreign Application Priority Data

Jan. 23, 2015   (JP) .................................. 2015-010909

(51) Int. Cl.
*H01G 4/232* (2006.01)
*H01G 4/30* (2006.01)

(52) U.S. Cl.
CPC .............. *H01G 4/232* (2013.01); *H01G 4/30* (2013.01)

(58) Field of Classification Search
CPC .................................. H01G 4/232; H01G 4/30
See application file for complete search history.

(56) References Cited

U.S. PATENT DOCUMENTS

| 2009/0154055 A1* | 6/2009 | Takashima | H01G 4/30 |
| | | | 361/301.4 |
| 2009/0190285 A1* | 7/2009 | Kusano | H01G 4/232 |
| | | | 361/321.4 |
| 2012/0134068 A1* | 5/2012 | Chae | H01G 4/012 |
| | | | 361/321.2 |
| 2013/0141837 A1* | 6/2013 | Lee | H01G 4/012 |
| | | | 361/321.2 |
| 2013/0229748 A1* | 9/2013 | Chung | H01G 4/005 |
| | | | 361/301.4 |
| 2014/0285947 A1* | 9/2014 | Suga | H01G 4/232 |
| | | | 361/301.4 |
| 2014/0368968 A1* | 12/2014 | Lee | H01G 4/005 |
| | | | 361/301.4 |

(Continued)

FOREIGN PATENT DOCUMENTS

| CN | 104064353 A | 9/2014 |
| JP | H09-148175 A | 6/1997 |

(Continued)

*Primary Examiner* — David M Sinclair
(74) *Attorney, Agent, or Firm* — Oliff PLC

(57) ABSTRACT

A length in a third direction of a first connection portion is smaller than a length in the third direction of a first main electrode portion. A length in the third direction of a second connection portion is smaller than a length in the third direction of a second main electrode portion. A thickness in a first direction of an inner layer portion is smaller than each of the length in the third direction of the first connection portion and the length in the third direction of the second connection portion and smaller than each of a gap from a second side surface to the first connection portion in the third direction and a gap from the second side surface to the second connection portion in the third direction. The second side surfaces oppose each other in the third direction perpendicular to the first direction.

9 Claims, 16 Drawing Sheets

(56) References Cited

U.S. PATENT DOCUMENTS

2015/0041196 A1* 2/2015 Kim ..................... H01G 4/30
                                              174/260
2015/0060122 A1* 3/2015 Lee ..................... H05K 1/185
                                              174/260

FOREIGN PATENT DOCUMENTS

| JP | 2004047536 A | * | 2/2004 | |
|---|---|---|---|---|
| JP | 2008091400 A | * | 4/2008 | |
| JP | 2012099786 A | * | 5/2012 | ............. H01G 4/012 |

* cited by examiner

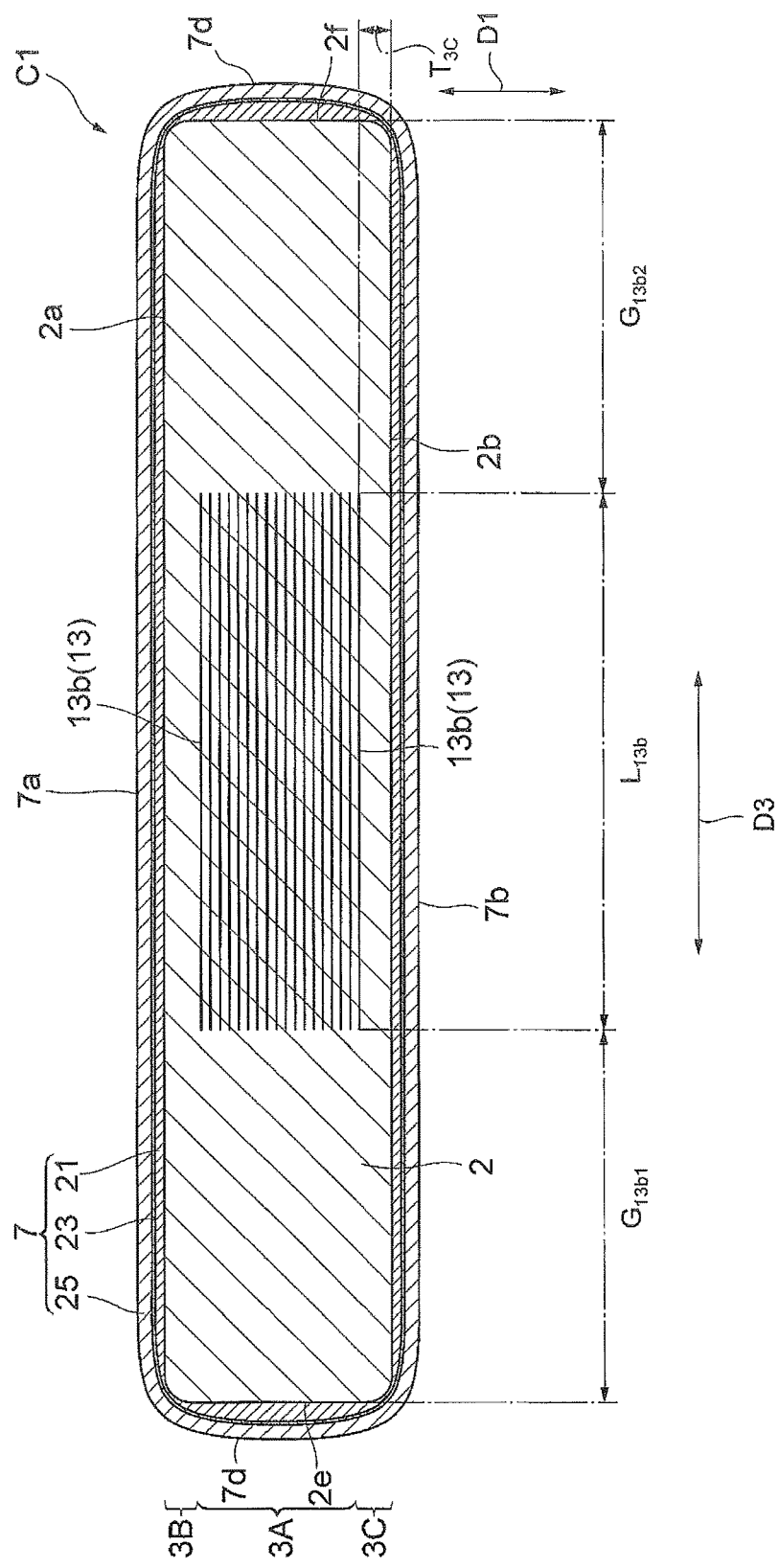

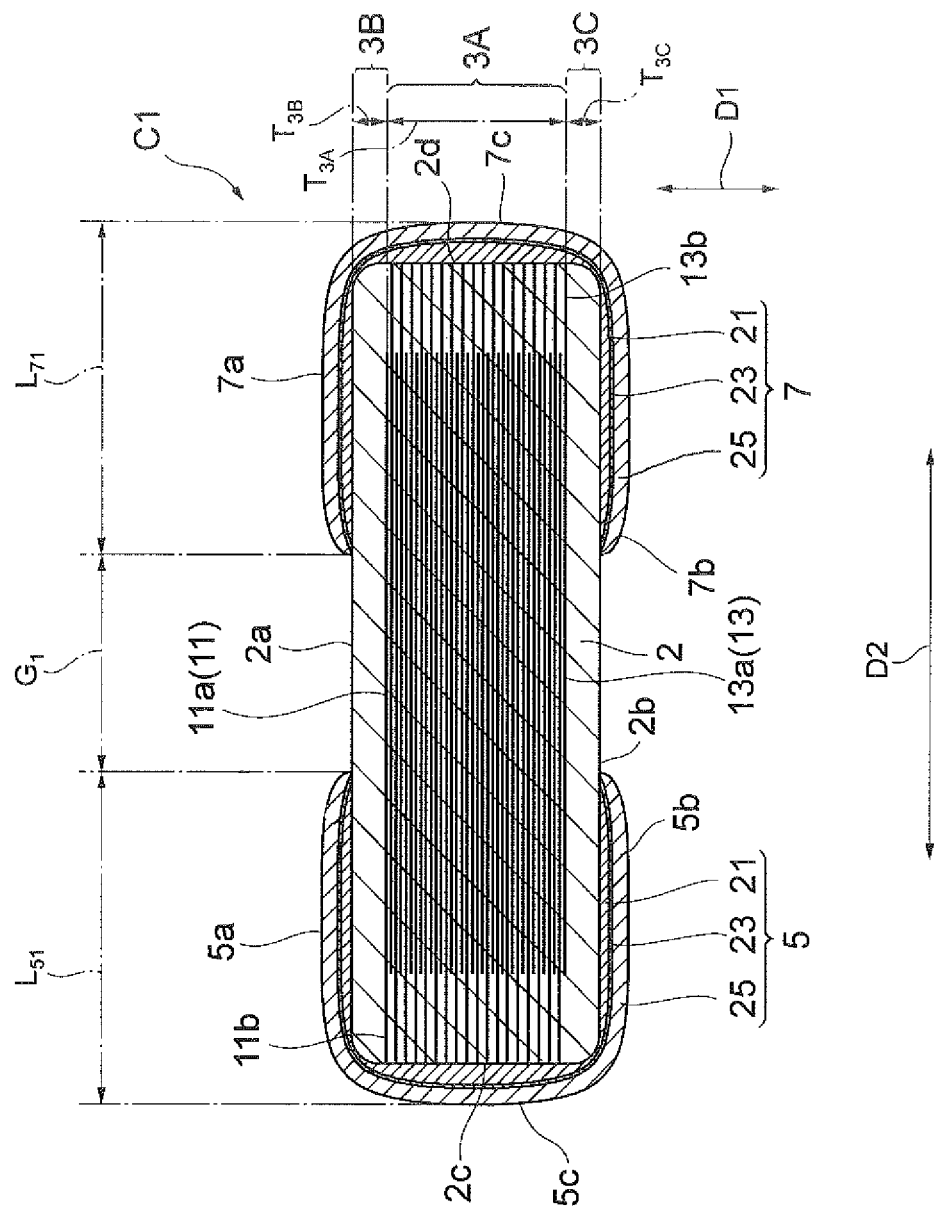

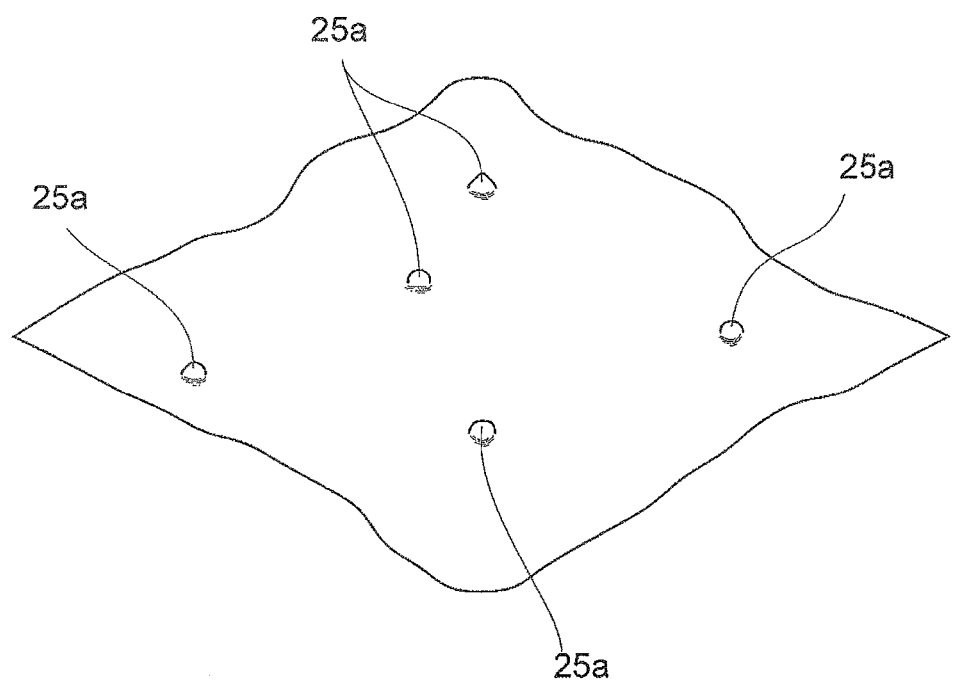

MULTILAYER CAPACITOR HAVING FIRST INTERNAL ELECTRODES AND SECOND INTERNAL ELECTRODES ALTERNATELY DISPOSED

TECHNICAL FIELD

The present invention relates to a multilayer capacitor.

BACKGROUND

Known multilayer capacitors include an element body of a rectangular parallelepiped shape, a plurality of first internal electrodes, a plurality of second internal electrodes, a first terminal electrode, and a second terminal electrode (e.g., cf, Japanese Unexamined Patent Publication No, H09-148175). The plurality of first and second internal electrodes are alternately disposed in the element body to oppose each other. The first terminal electrode is disposed on the element body and is connected to the plurality of first internal electrodes. The second terminal electrode is disposed on the element body and is connected to the plurality of second internal electrodes.

SUMMARY

Electronic equipment such as information terminal devices has been becoming smaller and thinner. In conjunction therewith, substrates mounted on the electronic equipment and electronic components mounted on the substrates have been downsized and mounted in higher density. Substrates with built-in electronic components have been developed for further reduction in size of electronic equipment. In such substrates with built-in electronic components, the electronic components are mounted on the substrate to be embedded therein. The embedded electronic component needs to be securely electrically connected to wiring formed on the substrate. In the case of the multilayer capacitor described in Japanese Unexamined Patent Publication No. H09-148175, however, no consideration is given to embedment in the substrate (built-in mounting in the substrate) and electrical connection to the wiring formed on the substrate.

One aspect of the present invention provides a multilayer capacitor that can be readily embedded in the substrate, achieves low ESL (Equivalent Series Inductance (L)), and prevents a plating solution from penetrating into the element body.

A multilayer capacitor according to one aspect of the present invention includes an element body of a rectangular parallelepiped shape, a plurality of first internal electrodes, a plurality of second internal electrodes, a first terminal electrode, and a second terminal electrode. The element body includes a pair of principal surfaces opposing each other in a first direction, a pair of first side surfaces opposing each other in a second direction perpendicular to the first direction, and a pair of second side surfaces opposing each other in a third direction perpendicular to the first and second directions. The plurality of first internal electrodes and the plurality of second internal electrodes are alternately disposed in the element body to oppose each other in the first direction. The first terminal electrode is disposed on the element body and connected to the plurality of first internal electrodes. The second terminal electrode is disposed on the element body and connected to the plurality of second internal electrodes. The element body includes an inner layer portion and a pair of outer layer portions. The inner layer portion is located between the pair of outer layer portions. The plurality of first internal electrodes and the plurality of second internal electrodes are located in the inner layer portion. A length in the first direction of the element body is smaller than a length in the second direction of the element body and smaller than a length in the third direction of the element body. The first terminal electrode includes a first electrode portion disposed on the principal surface and a second electrode portion disposed on one of the first side surfaces. The second terminal electrode includes a third electrode portion disposed on the principal surface and a fourth electrode portion disposed on the other of the first side surfaces. The third electrode portion is separated from the first electrode portion in the second direction on the principal surface. Each of the first internal electrodes includes a first main electrode portion, and a first connection portion connecting the first main electrode portion and the second electrode portion. The first connection portion is exposed at the one first side surface. Each of the second internal electrodes includes a second main electrode portion, and a second connection portion connecting the second main electrode portion and the fourth electrode portion. The second main electrode portion opposes the first main electrode portion in the first direction. The second connection portion is exposed at the other first side surface. A length in the third direction of the first connection portion is smaller than a length in the third direction of the first main electrode portion. A length in the third direction of the second connection portion is smaller than a length in the third direction of the second main electrode portion. A thickness in the first direction of the inner layer portion is smaller than the length in the third direction of the first connection portion and smaller than the length in the third direction of the second connection portion. The thickness in the first direction of the inner layer portion is smaller than a gap from the second side surface to the first connection portion in the third direction and smaller than a gap from the second side surface to the second connection portion in the third direction.

In the multilayer capacitor according to the one aspect, the length in the first direction of the element body is smaller than the length in the second direction of the element body and smaller than the length in the third direction of the element body. For this reason, the multilayer capacitor is obtained that has reduced height and the multilayer capacitor is realized that is suitable for built-in mounting in a substrate. The first terminal electrode includes the first electrode portion disposed on the principal surface of the element body and the second terminal electrode includes the third electrode portion disposed on the principal surface of the element body. The multilayer capacitor according to the one aspect can be electrically connected to wiring formed on the substrate, on the foregoing principal surface side of the element body. Therefore, the multilayer capacitor according to the one aspect can be readily built into the substrate.

For securely implementing the electrical connection between the first and second terminal electrodes and the wiring formed on the substrate, the outermost layers of the first and second terminal electrodes are, for example, plated layers. In this case, during formation of the plated layers, a plating solution may penetrate into the element body from the exposed ends of the first and second connection portions on the first side surfaces. If the plating solution should penetrate into the element body, it could degrade electrical characteristics such as insulation resistance.

In the multilayer capacitor according to the one aspect, the gap from the second side surface to the first connection portion in the third direction and the gap from the second side surface to the second connection portion in the third direction are larger than the thickness in the first direction of the inner layer portion. For this reason, the plating solution is less likely to reach the exposed ends of the first and second connection portions on the first side surfaces in the multilayer capacitor according to the one aspect, compared to in a multilayer capacitor in which the gap from the second side surface to the first connection portion in the third direction and the gap from the second side surface to the second connection portion in the third direction are not more than the thickness in the first direction of the inner layer portion. Thus, in the multilayer capacitor according to the one aspect, the plating solution can be prevented from penetrating into the element body. It is also feasible to achieve further reduction in height of the multilayer capacitor due to the thickness in the first direction of the inner layer portion being smaller than the gap from the second side surface to the first connection portion in the third direction and smaller than the gap from the second side surface to the second connection portion in the third direction.

The thickness in the first direction of the inner layer portion is smaller than the length in the third direction of the first connection portion and smaller than the length in the third direction of the second connection portion. This makes electric current paths shorter in the multilayer capacitor, thereby achieving a reduction in ESL. Furthermore, it is also feasible to achieve further reduction in height of the multilayer capacitor. The length in the third direction of the first connection portion and the length in the third direction of the second connection portion are larger than the thickness in the first direction of the inner layer portion. Thus, in the multilayer capacitor according to the one aspect, increases in ESR (Equivalent Series Resistance) and ESL can be suppressed, compared to a multilayer capacitor in which the length in the third direction of the first connection portion and the length in the third direction of the second connection portion are not more than the thickness in the first direction of the inner layer portion.

The length in the third direction of the first connection portion may be smaller than a total value of a gap from one of the second side surfaces to the first connection portion in the third direction and a gap from the other of the second side surfaces to the first connection portion in the third direction. The length in the third direction of the second connection portion may be smaller than a total value of a gap from one of the second side surfaces to the second connection portion in the third direction and a gap from the other of the second side surfaces to the second connection portion in the third direction. In these cases, the plating solution is much less likely to reach the exposed ends of the first and second connection portions on the first side surfaces. The plating solution can be further prevented from penetrating into the element body.

The length in the third direction of the first connection portion may be smaller than the gap from the second side surface to the first connection portion in the third direction. The length in the third direction of the second connection portion may be smaller than the gap from the second side surface to the second connection portion in the third direction. In these cases, the plating solution is much less likely to reach the exposed ends of the first and second connection portions on the first side surfaces. The plating solution can be further prevented from penetrating into the element body.

The length in the first direction of the element body may be smaller than the length in the third direction of the first connection portion and smaller than the length in the third direction of the second connection portion. The length in the first direction of the element body may be smaller than the gap from the second side surface to the first connection portion in the third direction and smaller than the gap from the second side surface to the second connection portion in the third direction. In these cases, it is feasible to achieve further reduction in height of the multilayer capacitor. It is also feasible to achieve further reduction in ESL and further suppress the increase in ESR.

The length in the first direction of the element body may be smaller than a gap between the first electrode portion and the third electrode portion in the second direction. In this case, it is feasible to achieve further reduction in height of the multilayer capacitor and further reduction in ESL.

The length in the third direction of the element body may be larger than the length in the second direction of the element body. This case makes electric current paths much shorter in the multilayer capacitor, thereby achieving a further reduction in ESL.

Each of the first terminal electrode and the second terminal electrode may include a sintered conductor layer formed on the element body, a first plated layer formed on the sintered conductor layer, and a second plated layer formed on the first plated layer. In this case, the sintered conductor layer contains Cu or Ni, the first plated layer contains Ni or Sn, and the second plated layer contains Cu or Au. In this embodiment, the first connection portion and the first terminal electrode are securely kept in contact with each other due to the first connection portion being connected to the sintered conductor layer of the first terminal electrode. The second connection portion and the second terminal electrode are securely kept in contact with each other due to the second connection portion being connected to the sintered conductor layer of the second terminal electrode. It is feasible to further ensure connectivity between the wiring formed on the substrate and the first and second terminal electrodes due to the second plated layer containing Cu or Au. The first plated layer prevents the sintered conductor layer from being damaged by the plating solution during formation of the second plated layer. For this reason, it is feasible to suppress degradation of insulation resistance of the multilayer capacitor.

The second plated layer may be a Cu-plated layer, and projections being made of Cu may be formed on a surface of the Cu-plated layer. The multilayer capacitor is disposed in a housing portion of a substrate and thereafter the housing portion is filled with a resin, whereby the multilayer capacitor is built into the substrate. When the projections are formed on the second plated layer, the projections form unevenness on the surface of the second plated layer. The configuration whereby the projections are formed on the second plated layer provides the second plated layer with a large surface area and better engagement between the second plated layer and resin due to the unevenness, compared to a configuration without the projections. Therefore, adhesion between the second plated layer and resin can be improved when the multilayer capacitor is built into the substrate.

A thickness in the first direction of each of the outer layer portions may be smaller than a thickness in the first direction of the first electrode portion and smaller than a thickness in the first direction of the third electrode portion. In this case, it is feasible to achieve further reduction in height of the multilayer capacitor.

After the multilayer capacitor is built into the substrate, laser processing is performed to form via holes in the substrate to reach the first terminal electrode and the second terminal electrode. At this time, the first terminal electrode and the second terminal electrode are irradiated with a laser beam, and may be damaged by the laser beam. Since the thickness in the first direction of the first electrode portion and the thickness in the first direction of the third electrode portion are larger than the thickness in the first direction of each outer layer portion, it is feasible to suppress the effect of damage due to the irradiation with the laser beam.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5 is a drawing for explaining a cross-sectional configuration along the line V-V in FIG. 2. FIG. 6 is a drawing for explaining a cross-sectional configuration along the line VI-VI in FIG. 2.

FIG. 8 is a perspective view showing a third electrode layer.

DETAILED DESCRIPTION

Embodiments of the present invention will be described below in detail with reference to the accompanying drawings. In the description, the same elements or elements with the same functionality will be denoted by the same reference signs, without redundant description.

Figure 1:
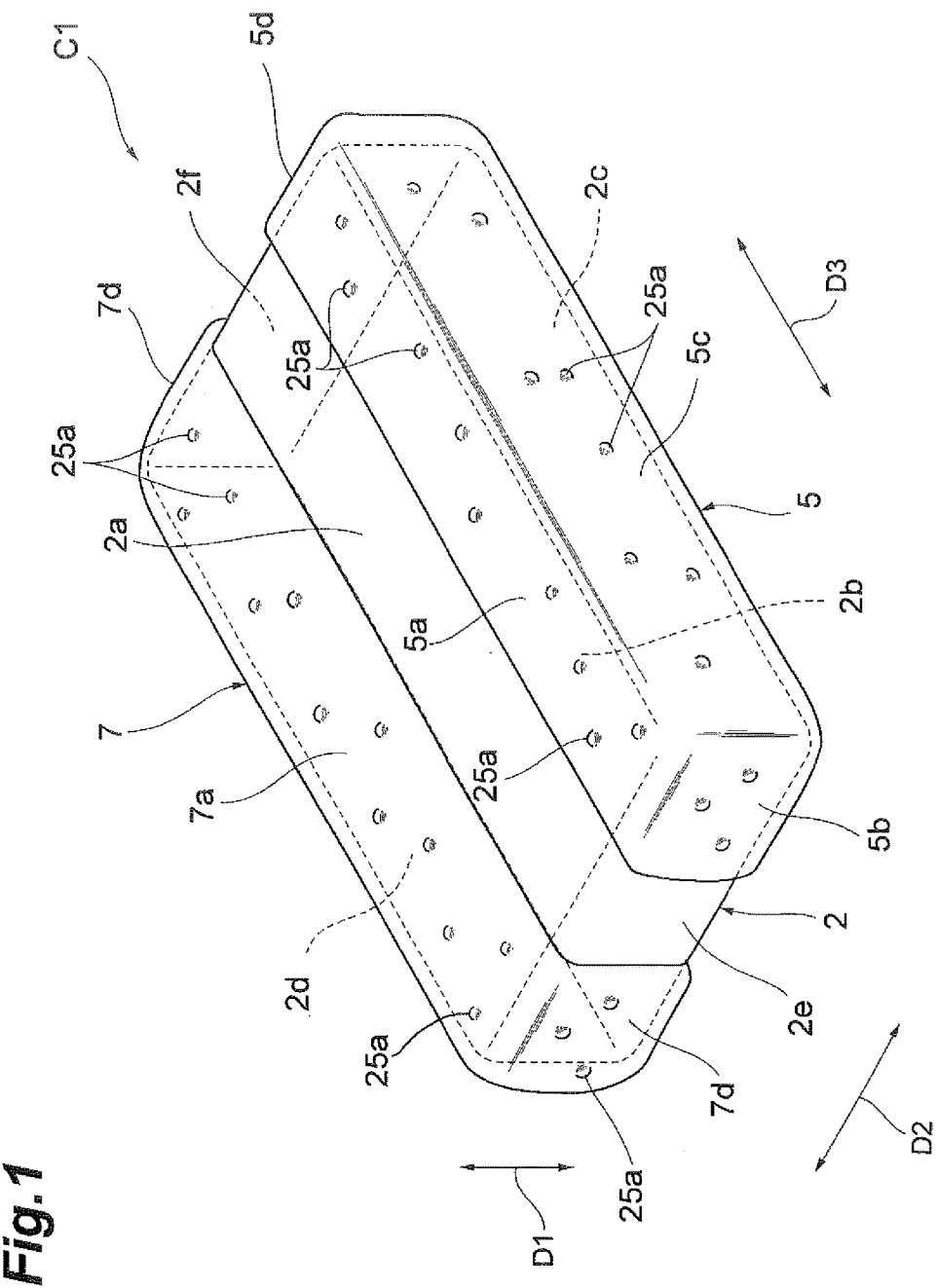
FIG. 1 is a perspective view showing a multilayer capacitor according to one embodiment.
Figure 2:
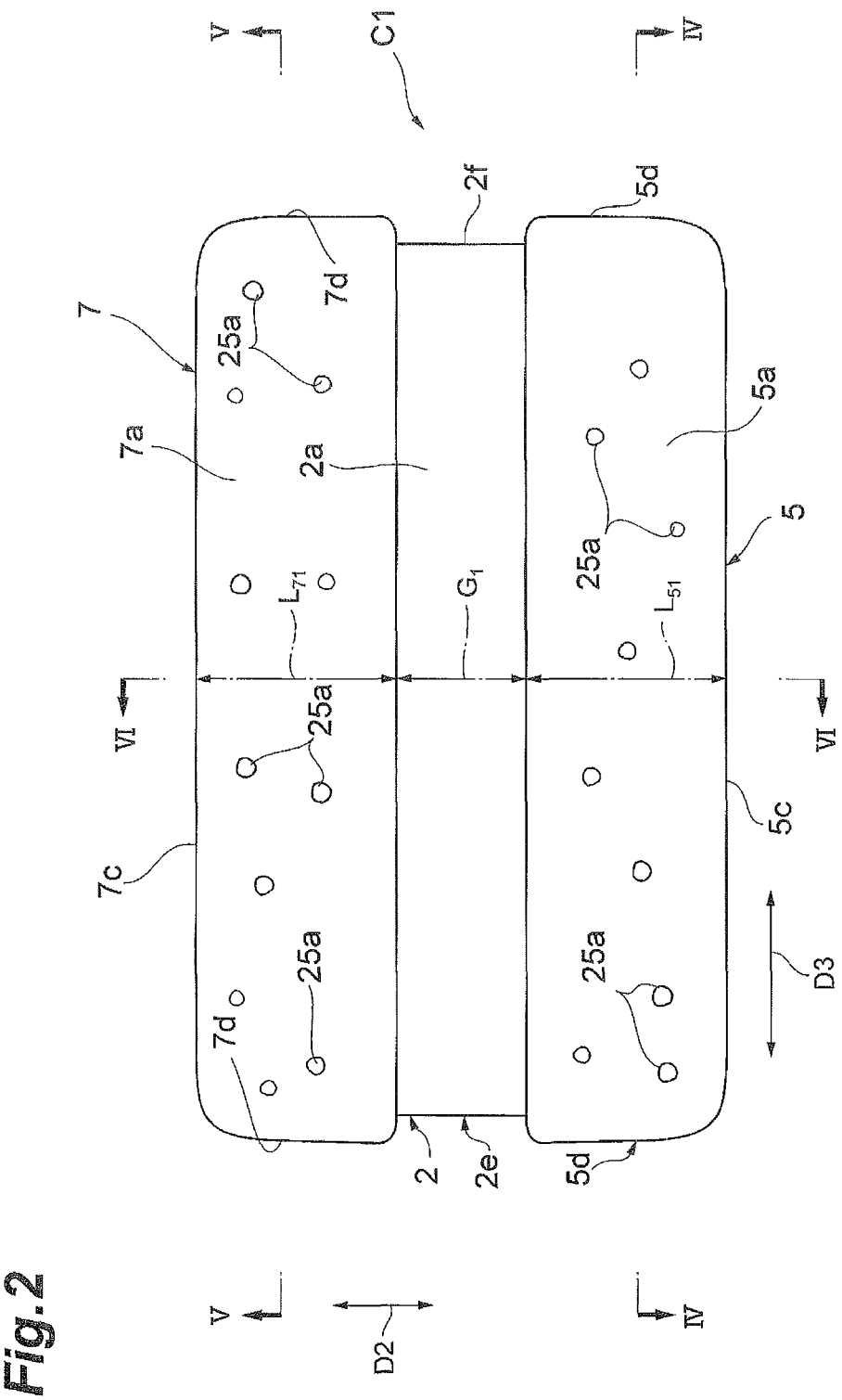
FIG. 2 is a plan view showing the multilayer capacitor according to the embodiment.
Figure 3:
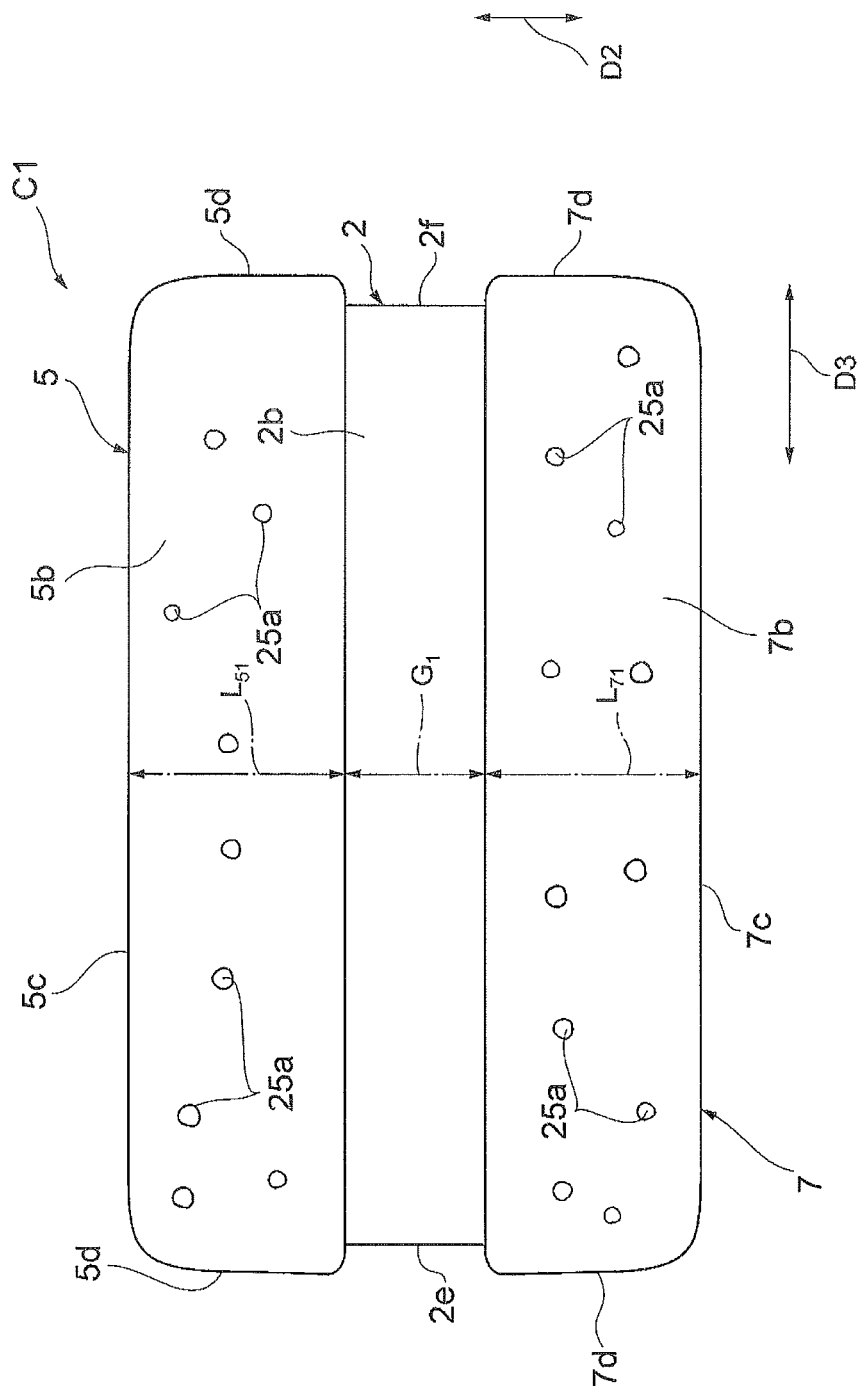
FIG. 3 is a plan view showing the multilayer capacitor according to the embodiment.
Figure 4:
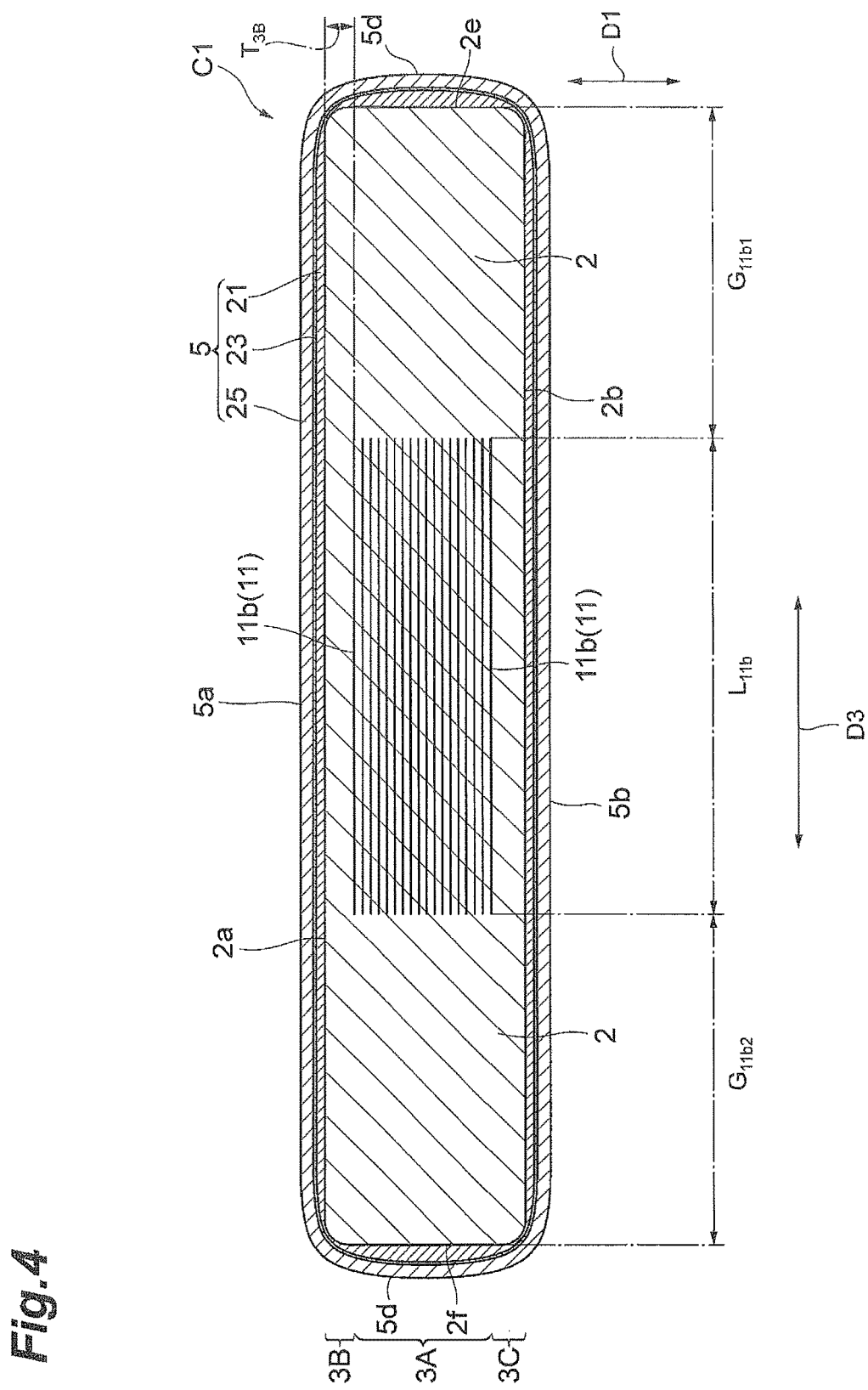
FIG. 4 is a drawing for explaining a cross-sectional configuration along the line IV-IV in FIG. 2.

A configuration of a multilayer capacitor C1 according to the present embodiment will be described with reference to FIGS. 1 to 6. FIG. 1 is a perspective view showing the multilayer capacitor according to the present embodiment. FIG. 2 and FIG. 3 are plan views showing the multilayer capacitor according to the present embodiment. FIG. 4 is a drawing for explaining a cross-sectional configuration along the line IV-IV in FIG. 2. FIG. 5 is a drawing for explaining a cross-sectional configuration along the line V-V in FIG. 2. FIG. 6 is a drawing for explaining a cross-sectional configuration along the line VI-VI in FIG. 2.

The multilayer capacitor C1, as shown in FIGS. 1 to 6, includes an element body 2 of a rectangular parallelepiped shape, and, a first terminal electrode 5 and a second terminal electrode 7 disposed on an outer surface of the element body 2. The first terminal electrode 5 and second terminal electrode 7 are separated from each other. The rectangular parallelepiped shape embraces a shape of a rectangular parallelepiped with chamfered corners and ridgelines, and a shape of a rectangular parallelepiped with rounded corners and ridgelines.

The element body 2 includes, as the outer surface, a pair of principal surfaces $2a$, $2b$ of a substantially rectangular shape opposing each other, a pair of first side surfaces $2c$, $2d$ opposing each other, and a pair of second side surfaces $2e$, $2f$ opposing each other. A direction in which the pair of principal surfaces $2a$, $2b$ oppose is a first direction D1, a direction in which the pair of first side surfaces $2c$, $2d$ oppose is a second direction D2, and a direction in which the pair of second side surfaces $2e$, $2f$ oppose is a third direction D3. In the present embodiment, the first direction D1 is a height direction of the element body 2. The second direction D2 is a width direction of the element body 2 and is perpendicular to the first direction D1. The third direction D3 is the longitudinal direction of the element body 2 and is perpendicular to the first direction D1 and to the second direction D2.

The length in the first direction D1 of the element body 2 is smaller than the length in the third direction D3 of the element body 2 and smaller than the length in the second direction D2 of the element body 2. The length in the third direction D3 of the element body 2 is larger than the length in the second direction D2 of the element body 2. The length in the third direction D3 of the element body 2 is, for example, from 0.4 to 1.6 mm. The length in the second direction D2 of the element body 2 is, for example, from 0.2 to 0.8 mm. The length in the first direction D1 of the element body 2 is, for example, from 0.1 to 0.35 mm. The multilayer capacitor C1 is an ultra-low-profile multilayer capacitor. The length in the third direction D3 of the element body 2 may be equivalent to the length in the second direction D2 of the element body 2.

It is noted herein that the term "equivalent" does not always mean that values are exactly equal. The values may also be said to be equivalent in cases where the values have a slight difference within a predetermined range or include a manufacturing error or the like. For example, when a plurality of values fall within the range of ±5% of an average of the plurality of values, the plurality of values may be defined as equivalent.

The pair of first side surfaces $2c$, $2d$ extend in the first direction D1 to connect the pair of principal surfaces $2a$, $2b$. The pair of first side surfaces $2c$, $2d$ also extend in the third direction D3 (the long-side direction of the pair of principal surfaces $2a$, $2b$). The pair of second side surfaces $2e$, $2f$ extend in the first direction D1 to connect the pair of principal surfaces 2a, 2b. The pair of second side surfaces 2e, 2f also extend in the second direction D2 (the short-side direction of the pair of principal surfaces 2a, 2b).

The element body 2 is constituted of a plurality of dielectric layers stacked in the direction in which the pair of principal surfaces 2a, 2b oppose (the first direction D1). In the element body 2, the direction in which the plurality of dielectric layers are stacked coincides with the first direction D1. For example, each dielectric layer includes a sintered body of a ceramic green sheet containing a dielectric material ($BaTiO_3$-based, $Ba(Ti, Zr)O_3$-based, $(Ba, Ca)TiO_3$-based, or other dielectric ceramic). In the element body 2 in practice, the dielectric layers are so integrated that no boundary can be visually recognized between the dielectric layers.

The multilayer capacitor C1, as shown in FIGS. 4 to 6, includes a plurality of first internal electrodes 11 and a plurality of second internal electrodes 13. The first and second internal electrodes 11, 13 contain an electroconductive material (e.g., Ni or Cu or the like) that is commonly used as internal electrodes of multilayer electric elements. Each of the first and second internal electrodes 11, 13 includes a sintered body of an electroconductive paste containing the foregoing electroconductive material.

The first internal electrodes 11 and the second internal electrodes 13 are disposed at different positions (layers) in the first direction D1. The first internal electrodes 11 and the second internal electrodes 13 are alternately disposed to oppose with a space in between in the first direction D1, in the element body 2. The first internal electrodes 11 and the second internal electrodes 13 have respective polarities different from each other.

Figure 7A:
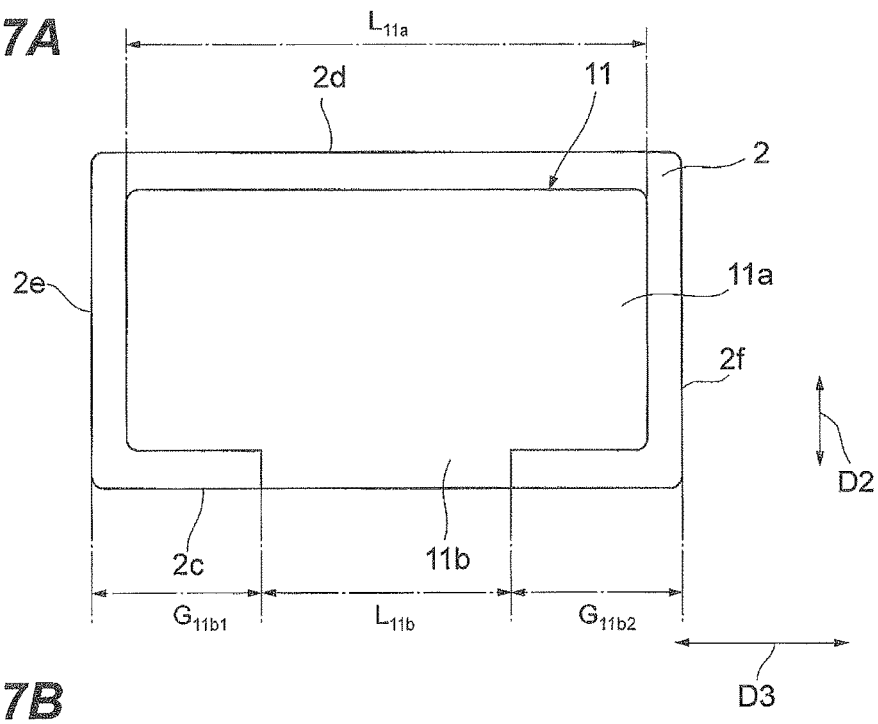
FIG. 7A is a plan view showing a first internal electrode and FIG. 7B a plan view showing a second internal electrode.

Each first internal electrode 11, as shown in FIG. 7A, includes a main electrode portion 11a and a connection portion 11b. The connection portion 11b extends from one side of the main electrode portion 11a and is exposed at the first side surface 2c. The first internal electrode 11 is exposed at the first side surface 2c but not exposed at the pair of principal surfaces 2a, 2b, the first side surface 2d, and the pair of second side surfaces 2e, 2f. The main electrode portion 11a and the connection portion 11b are integrally formed.

The main electrode portion 11a is of a rectangular shape with the long sides along the third direction D3 and the short sides along the second direction D2. In the main electrode portion 11a of each first internal electrode 11, the length thereof in the third direction D3 is larger than the length thereof in the second direction D2. The connection portion 11b extends from the end on the first side surface. 2c side of the main electrode portion 11a to the first side surface 2c. The length $L_{11b}$ in the third direction D3 of the connection portion 11b is smaller than the length $L_{11a}$ in the third direction D3 of the main electrode portion 11a. The length in the second direction D2 of the connection portion 11b is smaller than the length in the second direction D2 of the main electrode portion 11a. The connection portion 11b is connected at its end exposed at the first side surface 2c, to the first terminal electrode 5.

Figure 7B:
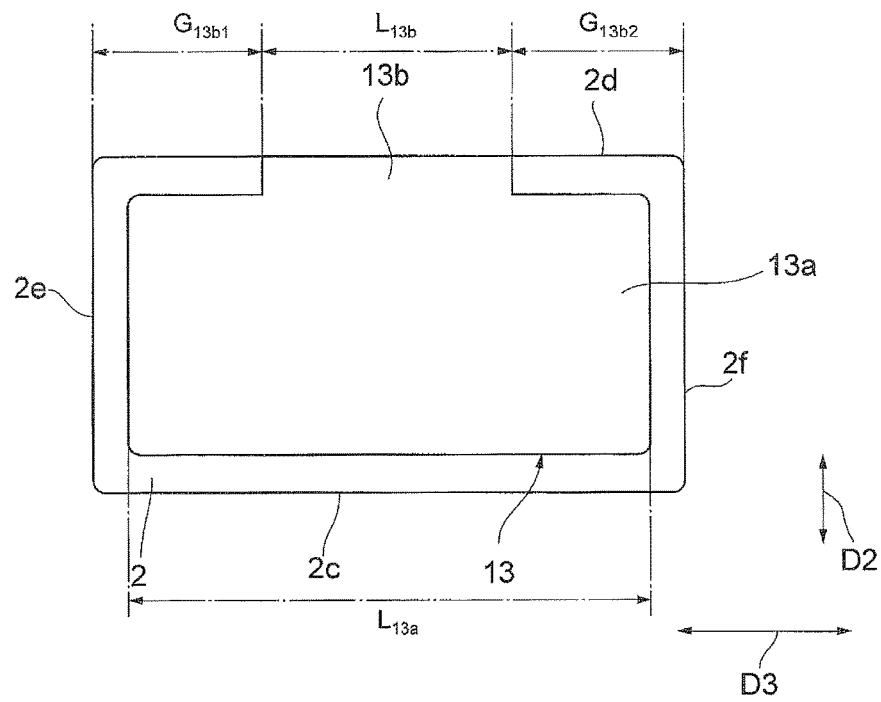

Each second internal electrode 13, as shown in FIG. 7B, includes a main electrode portion 13a and a connection portion 13b. The main electrode portion 13a opposes the main electrode portion 11a through a part (dielectric layer) of the element body 2 in the first direction D1. The connection portion 13b extends from one side of the main electrode portion 13a and is exposed at the first side surface 2d. The second internal electrode 13 is exposed at the first side surface 2d but not exposed at the pair of principal surfaces 2a, 2b, the first side surface 2c, and the pair of second side surfaces 2e, 2f. The main electrode portion 13a and the connection portion 13b are integrally formed.

The main electrode portion 13a is of a rectangular shape with the long sides along the third direction D3 and the short sides along the second direction D2. In the main electrode portion 13a of each second internal electrode 13, the length thereof in the third direction D3 is larger than the length thereof in the second direction D2. The connection portion 13b extends from the end on the first side surface 2d side of the main electrode portion 13a to the first side surface 2d. The length $L_{13b}$ in the third direction D3 of the connection portion 13b is smaller than the length $L_{13a}$ in the third direction D3 of the main electrode portion 13a. The length in the second direction D2 of the connection portion 13b is also smaller than the length in the second direction D2 of the main electrode portion 13a. The connection portion 13b is connected at its end exposed at the first side surface 2d, to the second terminal electrode 7.

The length $L_{11a}$ of the main electrode portion 11a is, for example, from 0.34 to 1.54 mm. The length $L_{11b}$ of the connection portion 11b is, for example, from 0.17 to 0.77 mm. The length $L_{13a}$ of the main electrode portion 13a is, for example, from 0.34 to 1.54 mm, The length $L_{13b}$ of the connection portion 13b is, for example, from 0.17 to 0.77 mm.

The element body 2, as shown in FIGS. 4 to 6, includes an inner layer portion 3A and a pair of outer layer portions 3B, 3C. The plurality of first internal electrodes 11 and the plurality of second internal electrodes 13 are located in the inner layer portion 3A. The inner layer portion 3A is located between the pair of outer layer portions 3B, 3C in the first direction D1. The first internal electrodes 11 and second internal electrodes 13 are not located in the pair of outer layer portions 3B, 3C.

The thickness $T_{3B}$ in the first direction D1 of the outer layer portion 3B is defined by a gap in the first direction D1 between the principal surface 2a and the internal electrode closest to the principal surface 2a (the first internal electrode 11 in the present embodiment). The thickness $T_{3C}$ in the first direction D1 of the outer layer portion 3C is defined by a gap in the first direction D1 between the principal surface 2b and the internal electrode closest to the principal surface 2b (the second internal electrode 13 in the present embodiment). The thickness $T_{3A}$ in the first direction D1 of the inner layer portion 3A is defined by a gap in the first direction D1 between the internal electrode closest to the principal surface 2a and the internal electrode closest to the principal surface 2b. A total value of the thickness $T_{3A}$ of the inner layer portion 3A, the thickness $T_{3B}$ of the outer layer portion 3B, and the thickness $T_{3C}$ of the outer layer portion 3C is equal to the length in the first direction D1 of the element body 2. The thicknesses $T_{3B}$, $T_{3C}$ of the respective outer layer portions 3B, 3C are smaller than the thickness $T_{3A}$ of the inner layer portion 3A.

The thickness $T_{3A}$ of the inner layer portion 3A is smaller than the length $L_{11b}$ of the connection portion 11b and smaller than the length $L_{13b}$ of the connection portion 13b. The thickness $T_{3A}$ of the inner layer portion 3A is smaller than a gap $G_{11b1}$ from the second side surface 2e to the connection portion 11b in the third direction D3. The thickness $T_{3A}$ of the inner layer portion 3A is smaller than a gap $G_{11b2}$ from the second side surface 2f to the connection portion 11b in the third direction D3. The thickness $T_{3A}$ of the inner layer portion 3A is smaller than a gap $G_{13b1}$ from the second side surface 2e to the connection portion 13b in the third direction D3. The thickness $T_{3A}$ of the inner layer portion 3A is smaller than a gap $G_{13b2}$ from the second side surface 2f to the connection portion 13b in the third direction D3.

The length in the first direction D1 of the element body 2 is smaller than the length $L_{11b}$ of the connection portion 11b and smaller than the length $L_{13b}$ of the connection portion 13b. The length in the first direction D1 of the element body 2 is smaller than the gap $G_{11b1}$ and smaller than the gap $G_{11b2}$. The length in the first direction D1 of the element body 2 is smaller than the gap $G_{13b1}$ and smaller than the gap $G_{13b2}$.

In the present embodiment, the gap $G_{11b1}$ and the gap $G_{11b2}$ are equivalent. The connection portion 11b is exposed at a central region in the third direction D3 of the first side surface 2c. The gap $G_{11b1}$ and the gap $G_{11b2}$ may be different. The gap $G_{13b1}$ and the gap $G_{13b2}$ are equivalent. The connection portion 13b is exposed at a central region in the third direction D3 of the first side surface 2d. The gap $G_{13b1}$ and the gap $G_{13b2}$ may be different. In the present embodiment, the gaps $G_{13b1}$, $G_{13b2}$, $G_{11b1}$, and $G_{11b2}$ are equivalent.

The length $L_{11b}$ of the connection portion 11b is smaller than a total value of the gap $G_{11b1}$ and the gap $G_{11b2}$. The length $L_{13b}$ of the connection portion 13b is smaller than a total value of the gap $G_{13b1}$ and the gap $G_{13b2}$.

The first terminal electrode 5 is located at the end on the first side surface 2c side of the element body 2 when viewed along the second direction D2. The first terminal electrode 5 includes an electrode portion 5a disposed on the principal surface 2a, an electrode portion 5b disposed on the principal surface 2b, an electrode portion 5c disposed on the first side surface 2c, and electrode portions 5d disposed on the pair of second side surfaces 2e, 2f. The first terminal electrode 5 is formed on the five surfaces 2a, 2b, 2c, 2e, and 2f. The electrode portions 5a, 5b, 5c, 5d adjacent to each other are connected to each other at the ridgelines of the element body 2 to be electrically connected to each other.

The second terminal electrode 7 is located at the end on the first side surface 2d side of the element body 2 when viewed along the second direction D2. The second terminal electrode 7 includes an electrode portion 7a disposed on the principal surface 2a, an electrode portion 7b disposed on the principal surface 2b, an electrode portion 7c disposed on the first side surface 2d, and electrode portions 7d disposed on the pair of second side surfaces 2e, 2f. The second terminal electrode 7 is formed on the five surfaces 2a, 2b, 2d, 2e, and 2f. The electrode portions 7a, 7b, 7c, 7d adjacent to each other are connected to each other at the ridgelines of the element body 2 to be electrically connected to each other.

The electrode portion 5c is disposed to cover all exposed portions of the respective connection portions 11b on the first side surface 2c. Each connection portion 11b is directly connected to the first terminal electrode 5. The connection portion 11b connects the main electrode portion 11a and the electrode portion 5c. Each first internal electrode 11 is electrically connected to the first terminal electrode 5. The electrode portion 7c is disposed to cover all exposed portions of the respective connection portions 13b on the first side surface 2d. Each connection portion 13b is directly connected to the second terminal electrode 7. The connection portion 13b connects the main electrode portion 13a and the electrode portion 7c. Each second internal electrode 13 is electrically connected to the second terminal electrode 7.

The electrode portion 5a and the electrode portion 7a disposed on the principal surface 2a are separated in the second direction D2 on the principal surface 2a. The electrode portion 5b and the electrode portion 7b disposed on the principal surface 2b are separated in the second direction D2 on the principal surface 2b. The electrode portion 5d and the electrode portion 7d disposed on the second side surface 2e are separated in the second direction D2 on the second side surface 2e. The electrode portion 5d and the electrode portion 7d disposed on the second side surface 2f are separated in the second direction D2 on the second side surface 2f.

The length $L_{51}$ in the second direction D2 of the first terminal electrode 5 (electrode portions 5a, 5b) and the length $L_{71}$ in the second direction D2 of the second terminal electrode 7 (electrode portions 7a, 7b) are equivalent when viewed from the first direction D1. The length $L_{51}$ of the first terminal electrode 5 is larger than a gap $G_1$ in the second direction D2 between the first terminal electrode 5 (electrode portions 5a, 5b) and the second terminal electrode 7 (electrode portions 7a, 7b) when viewed from the first direction D1. The length $L_{71}$ of the second terminal electrode 7 is larger than the gap $G_1$ when viewed from the first direction D1.

Each of the first and second terminal electrodes 5, 7 includes a first electrode layer 21, a second electrode layer 23, and a third electrode layer 25. Each of the electrode portions 5a, 5b, 5c, 5d and the electrode portions 7a, 7b, 7c, 7d includes the first electrode layer 21, second electrode layer 23, and third electrode layer 25. The third electrode layer 25 is the outermost layer of each of the first and second terminal electrodes 5, 7. In the present embodiment, each of the first and second terminal electrodes 5, 7 is composed of the first electrode layer 21, second electrode layer 23, and third electrode layer 25.

The first electrode layer 21 is formed by applying an electroconductive paste onto the surface of the element body 2 and sintering it. The first electrode layer 21 is a sintered conductor layer (sintered metal layer). In the present embodiment, the first electrode layer 21 is a sintered conductor layer made of Cu. The first electrode layer 21 may be a sintered conductor layer made of Ni. The first electrode layer 21 contains Cu or Ni. For example, the electroconductive paste is obtained by mixing a powder made of Cu or Ni, a glass component, an organic binder, and an organic solvent. The thickness of the first electrode layer 21 is, for example, 20 μm at a maximum.

The second electrode layer 23 is formed by plating on the first electrode layer 21. In the present embodiment, the second electrode layer 23 is an Ni-plated layer formed by Ni plating on the first electrode layer 21. The second electrode layer 23 may be an Sn-plated layer. The second electrode layer 23 contains Ni or Sn. The thickness of the second electrode layer 23 is, for example, from 1 to 5 μm.

The third electrode layer 25 is formed by plating on the second electrode layer 23. In the present embodiment, the third electrode layer 25 is a Cu-plated layer formed by Cu plating on the second electrode layer 23. The third electrode layer 25 may be an Au-plated layer. The third electrode layer 25 contains Cu or Au. The thickness of the third electrode layer 25 is, for example, from 1 to 15 μm.

A plurality of projections 25a are formed on the surface of the third electrode layer 25 being the Cu-plated layer, as also shown in FIG. 8. Each projection 25a is made of Cu. A diameter of each projection 25a is from 10 to 30 μm and a height of each projection 25a from 1 to 10 μm.

The thickness of each electrode portion 5a, 5b, 7a, or 7b is defined by a total value of the thicknesses of the first electrode layer 21, second electrode layer 23, and third electrode layer 25 constituting the electrode portion 5a, 5b, 7a, or 7b. The thickness of each electrode portion 5a, 5b, 7a, or 7b is, for example, from 5 to 40 μm. In the present embodiment, the thicknesses $T_{3B}$, $T_{3C}$ of the respective outer layer portions 3B, 3C are larger than the thickness in the first direction D1 of each electrode portion 5a, 5b, 7a, or 7b.

In the present embodiment, as described above, the length in the first direction D1 of the element body 2 is smaller than the length in the second direction D2 of the element body 2 and smaller than the length in the third direction D3 of the element body 2. For this reason, the multilayer capacitor C1 is obtained that has reduced height and the multilayer capacitor C1 is realized that is suitable for built-in mounting in a substrate. The first terminal electrode 5 includes the electrode portions 5a, 5b disposed on the principal surfaces 2a, 2b and the second terminal electrode 7 includes the electrode portions 7a, 7b disposed on the principal surfaces 2a, 2b. The multilayer capacitor C1 can be electrically connected to wiring formed on the substrate, on the principal surface 2a side of the element body 2, on the principal surface 2b side of the element body 2, or, on both of the principal surface 2a, 2b sides of the element body 2. Therefore, the multilayer capacitor C1 can be readily built into the substrate.

The first and second terminal electrodes 5, 7 include the second and third electrode layers 23, 25. The second and third electrode layers 23, 25 are the plated layers. For this reason, during formation of the second and third electrode layers 23, 25, a plating solution may penetrate into the element body 2 from the exposed end of the connection portion 11b on the first side surface 2c or from the exposed end of the connection portion 13b on the first side surface 2d. If the plating solution should penetrate into the element body 2, the multilayer capacitor C1 could undergo degradation of electrical characteristics such as insulation resistance.

In the present embodiment, each of the gaps $G_{13b1}$, $G_{13b2}$, $G_{11b1}$, and $G_{11b2}$ is larger than the thickness $T_{3A}$ of the inner layer portion 3A. For this reason, in the multilayer capacitor C1, the plating solution is less likely to reach the exposed ends of the connection portions 11b, 13b, compared to a multilayer capacitor in which each of the gaps $G_{13b1}$, $G_{13b2}$, $G_{11b1}$, and $G_{11b2}$ is not more than the thickness $T_{3A}$ of the inner layer portion 3A. Thus, in the multilayer capacitor C1, the plating solution can be prevented from penetrating into the element body 2. It is also feasible to achieve further reduction in height of the multilayer capacitor C1 due to the thickness $T_{3A}$ of the inner layer portion 3A being smaller than each of the gaps $G_{13b1}$, $G_{13b2}$, $G_{11b1}$, and $G_{11b2}$.

The thickness $T_{3A}$ of the inner layer portion 3A is smaller than the length $L_{11b}$ of the connection portion 11b and smaller than the length $L_{13b}$ of the connection portion 13b. This makes electric current paths shorter in the multilayer capacitor C1, so as to reduce ESL. Furthermore, it is also feasible to achieve further reduction in height of the multilayer capacitor C1. The length $L_{11b}$ of the connection portion 11b and the length $L_{13b}$ of the connection portion 13b are larger than the thickness $T_{3A}$ of the inner layer portion 3A. Thus, in the multilayer capacitor C1, increases in ESR and ESL can be suppressed, compared to a multilayer capacitor in which the length $L_{11b}$ of the connection portion 11b and the length $L_{13b}$ of the connection portion 13b are not more than the thickness $T_{3A}$ of the inner layer portion 3A.

The length $L_{11b}$ of the connection portion 11b is smaller than the total value of the gap $G_{11b1}$ and the gap $G_{11b2}$. The length $L_{13b}$ of the connection portion 13b is smaller than total value of the gap $G_{13b1}$ and the gap $G_{13b2}$. These make the plating solution much less likely to reach the exposed ends of the connection portions 11b, 13b. In the multilayer capacitor C1, the plating solution is further prevented from penetrating into the element body 2.

The length in the first direction D1 of the element body 2 is smaller than the length $L_{11b}$ of the connection portion 1ib and smaller than the length $L_{13b}$ of the connection portion 13b. The length in the first direction D1 of the element body 2 is smaller than each of the gaps $G_{13b1}$, $G_{13b2}$, $G_{11b1}$, and $G_{11b2}$. For this reason, it is feasible to achieve further reduction in height of the multilayer capacitor C1. In addition, the multilayer capacitor C1 is obtained that achieves further reduction in ESL and further suppressing the increase in ESR.

In the present embodiment, the length in the third direction D3 of the element body 2 is larger than the length in the second direction D2 of the element body 2. That is, the length in the second direction D2 of the element body 2 is smaller than the length in the third direction D3 of the element body 2. Since this makes the electric current paths much shorter in the multilayer capacitor C1, the multilayer capacitor C1 is obtained that achieves further reduction in ESL.

In the present embodiment, each of the first and second terminal electrodes 5, 7 includes the first electrode layer 21, second electrode layer 23, and third electrode layer 25. The first and second internal electrodes 11, 13 are securely kept in contact with the first electrode layers 21 due to the first and second internal electrodes 11, 13 being connected to the first electrode layers 21 being the sintered conductor layers. It is feasible to further ensure connectivity between the wiring formed on the substrate and the first and second terminal electrodes 5, 7 due to the third electrode layer 25 containing Cu or Au. The second electrode layer 23 prevents the first electrode layer 21 from being damaged by the plating solution, during for nation of the third electrode layer 25. For this reason, it is feasible to suppress degradation of insulation resistance of the multilayer capacitor C1.

The third electrode layer 25 is the Cu-plated layer and the projections 25a made of Cu are formed on the surface of the third electrode layer 25. As described below, the multilayer capacitor C1 is disposed in a housing portion of a substrate and thereafter the housing portion is filled with a resin, whereby the multilayer capacitor is built into the substrate. The projections 25a form unevenness on the surface of the third electrode layer 25. The configuration whereby the projections 25a are formed on the third electrode layer 25 provides the third electrode layer 25 with a larger surface area and better engagement between the third electrode layer 25 and the resin because of the foregoing unevenness, compared to a configuration without the projections 25a. Therefore, adhesion between the third electrode layer 25 and resin can be improved when the multilayer capacitor C1 is built into the substrate.

Figure 9A:
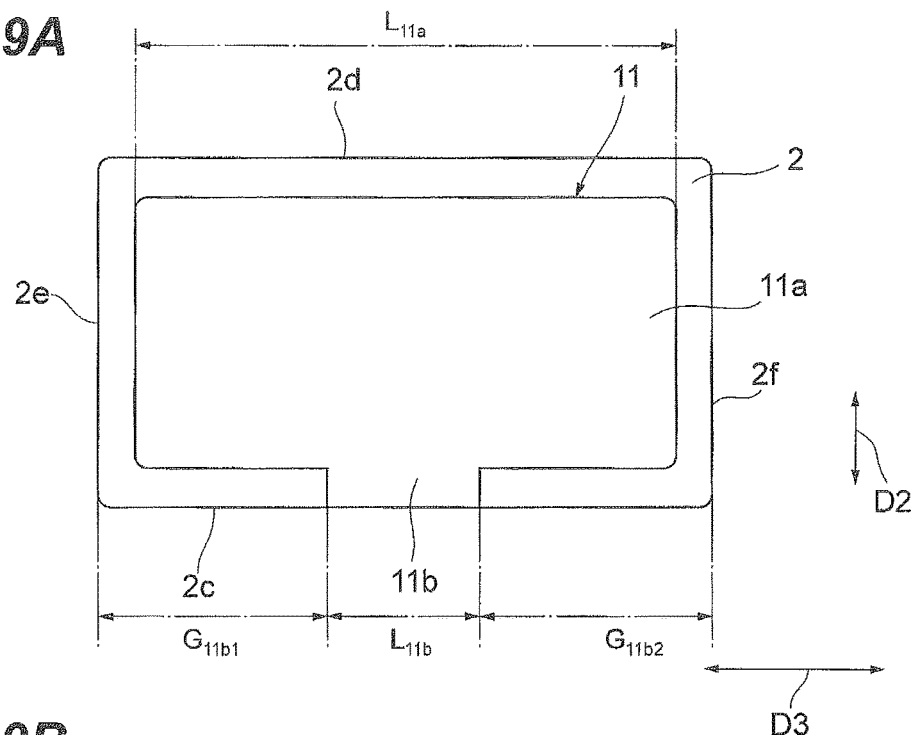
FIG. 9A is a plan view showing a modification example of the first internal electrode and FIG. 9B a plan view showing a modification example of the second internal electrode.
Figure 9B:
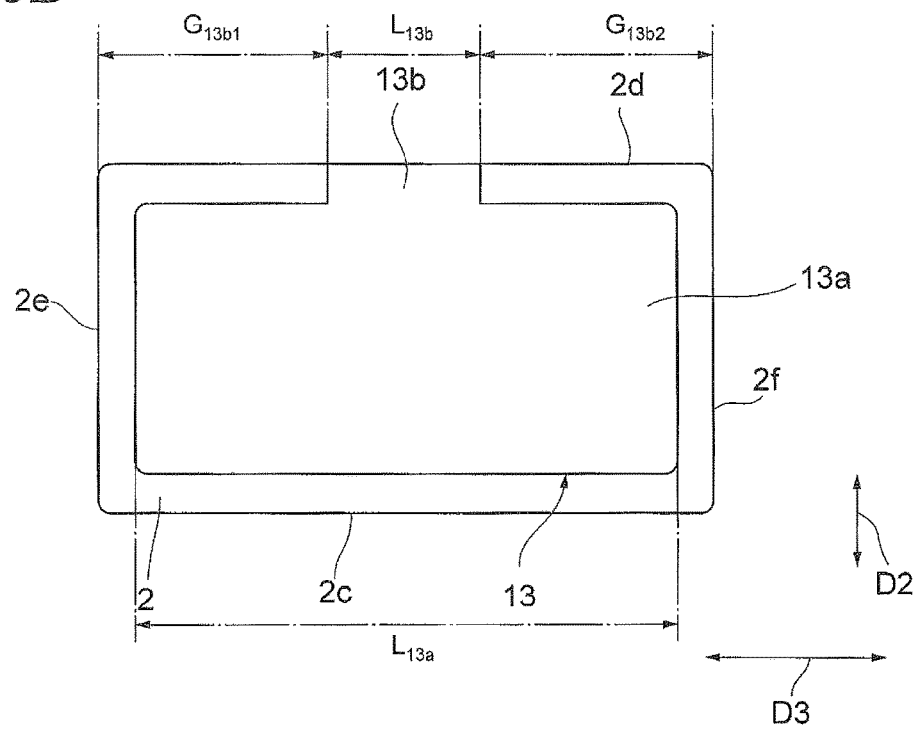

As shown in FIG. 9, the length $L_{11b}$ of the connection portion 11b may be smaller than each of the gaps $G_{11b1}$, $G_{11b2}$. The length $L_{13b}$ of the connection portion 13b may be smaller than each of the gaps $G_{13b1}$, $G_{13b2}$. In this case, the plating solution is much less likely to reach the exposed ends of the connection portions 11b, 13b, whereby the plating solution can be further prevented from penetrating into the element body 2.

The lengths $L_{11a}$, $L_{13a}$ of the respective main electrode portions 11a, 13a may be equivalent to the lengths $L_{11b}$, $L_{13b}$ of the respective connection portions 11b, 13b. In this case, the size (area) of the main electrode portions 11a, 13a becomes smaller and thus it becomes necessary to increase the number of stacked layers of the internal electrodes 11, 13, in order to ensure a desired capacitance. The increase in the number of stacked layers of the internal electrodes 11, 13 leads to increase in length in the first direction D1 of the element body 2, i.e., increase in height of the element body 2. The increase in the number of stacked layers of the internal electrodes 11, 13 hinders reduction in height of the multilayer capacitor C1. However, in the present embodiment, since the lengths $L_{11a}$, $L_{13a}$ of the respective main electrode portions 11a, 13a are larger than the lengths $L_{11b}$, $L_{13b}$ of the respective connection portions 11b, 13b, this configuration does not hinder the reduction in height of the multilayer capacitor C1.

Figure 10:
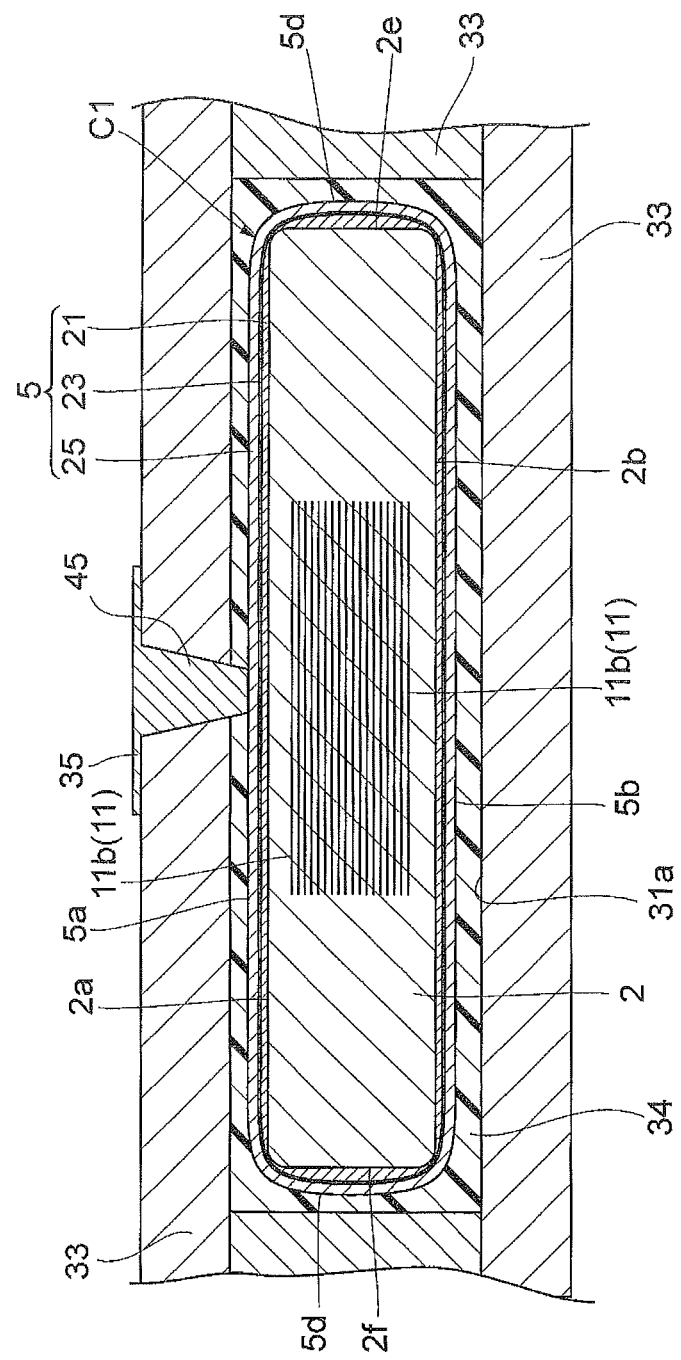
FIG. 10 is a drawing for explaining a mounted structure of the multilayer capacitor according to the embodiment.
Figure 11:
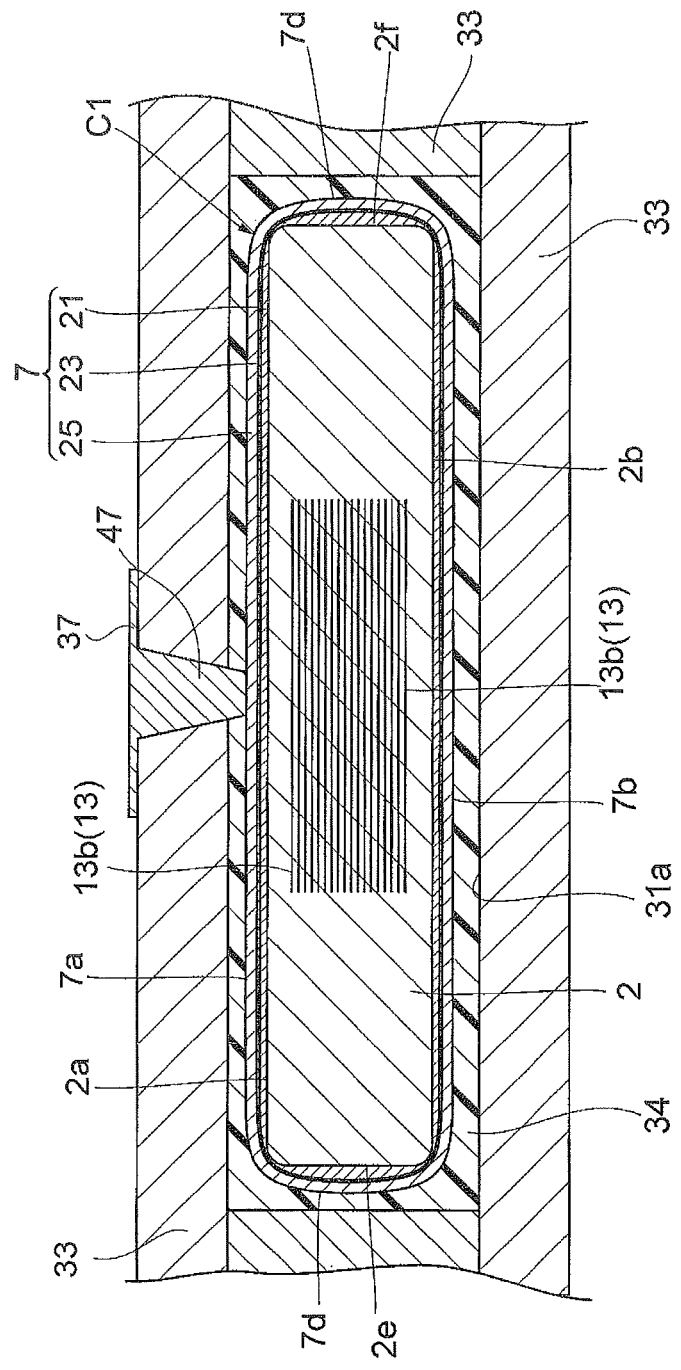
FIG. 11 is a drawing for explaining the mounted structure of the multilayer capacitor according to the embodiment
Figure 12:
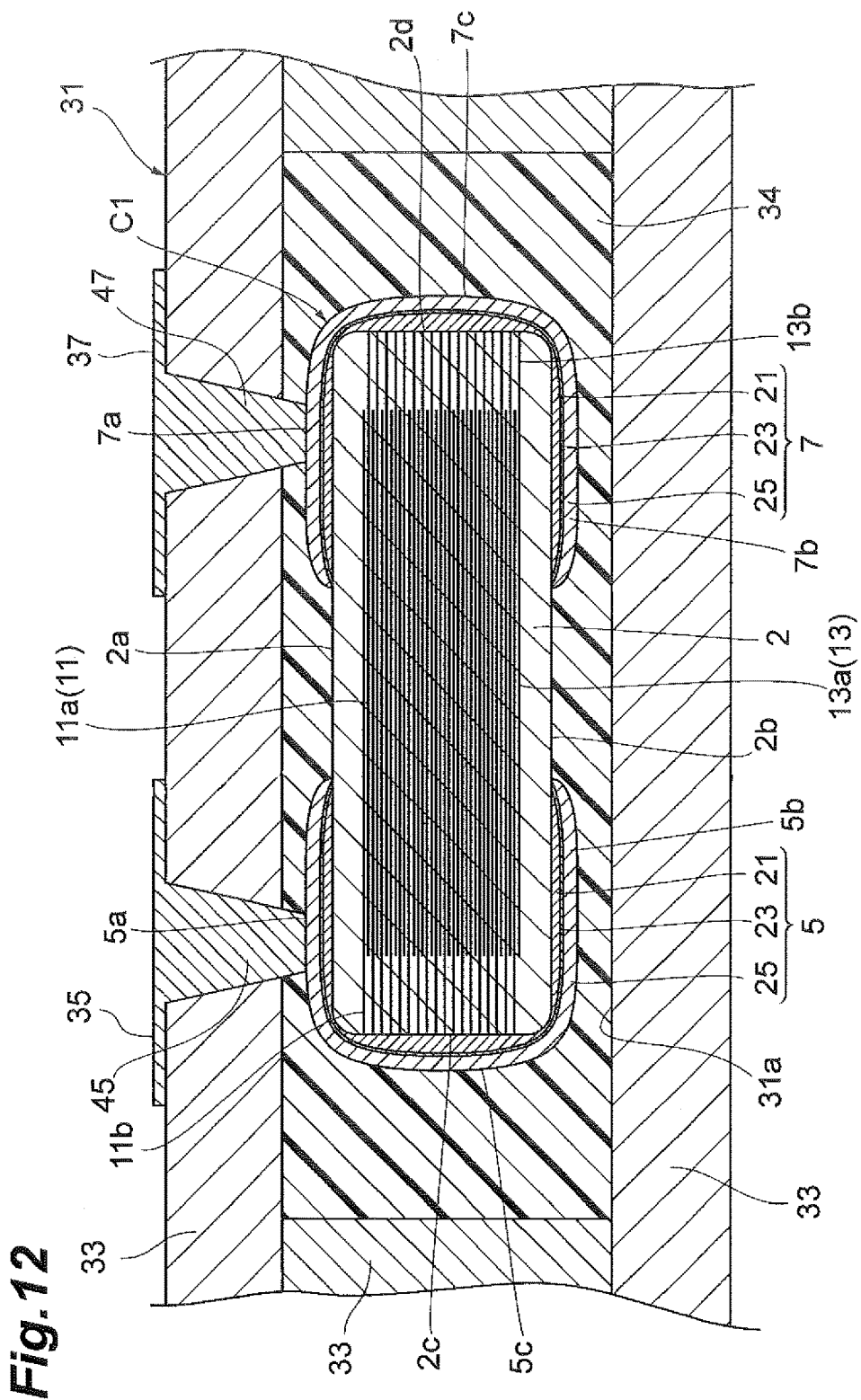
FIG. 12 is a drawing for explaining the mounted structure of the multilayer capacitor according to the embodiment.

The multilayer capacitor C1, as shown in FIGS. 10 to 12, is mounted as embedded in a substrate 31. The multilayer capacitor C1 is built into the substrate 31. FIGS. 10 to 12 are drawings for explaining a mounted structure of the multilayer capacitor according to the present embodiment.

The substrate 31 is constructed by stacking a plurality of insulating layers 33. The insulating layers 33 are made of an insulating material such as ceramic or resin, and are integrated with each other by adhesion or the like.

The multilayer capacitor C1 is disposed in a housing portion 31a formed in the substrate 31. The multilayer capacitor C1 is fixed to the substrate 31 by resin 34 filled in the housing portion 31a. The multilayer capacitor C1 is embedded in the substrate 31. The multilayer capacitor C1 is electrically connected through via conductors 45, 47 to electrodes 35, 37 disposed on the surface of the substrate 31. The first terminal electrode 5 (electrode portion 5a) is electrically connected through the via conductor 45 to the electrode 35. The second terminal electrode 7 (electrode portion 7a) is electrically connected through the via conductor 47 to the electrode 37.

The via conductors 45, 47 are formed by growing an electroconductive metal (e.g., Cu or Au or the like) in via holes formed in the substrate 31. The growth of the electroconductive metal is realized, for example, by electroless plating. The via holes are formed to reach the electrode portions 5a, 7a of the first and second terminal electrodes 5, 7 of the multilayer capacitor C1 from the surface side of the substrate 31. The via holes are formed, for example, by laser processing.

The first and second terminal electrodes 5, 7 include the sufficient electrode area in the regions on both end sides of the electrode portions 5a, 7a. For this reason, the first and second terminal electrodes 5, 7 (electrode portions 5a, 7a) can be certainly connected to the via conductors 45, 47.

In the multilayer capacitor C1, the electrode portions 5a, 7a include the third electrode layers 25 as plated layers. Therefore, the electrode portions 5a, 7a can be securely connected to the via conductors 45, 47 formed in the via holes. When the via conductors 45, 47 are formed by plating, the via conductors 45, 47 are more securely connected to the electrode portions 5a, 7a.

Figure 13:
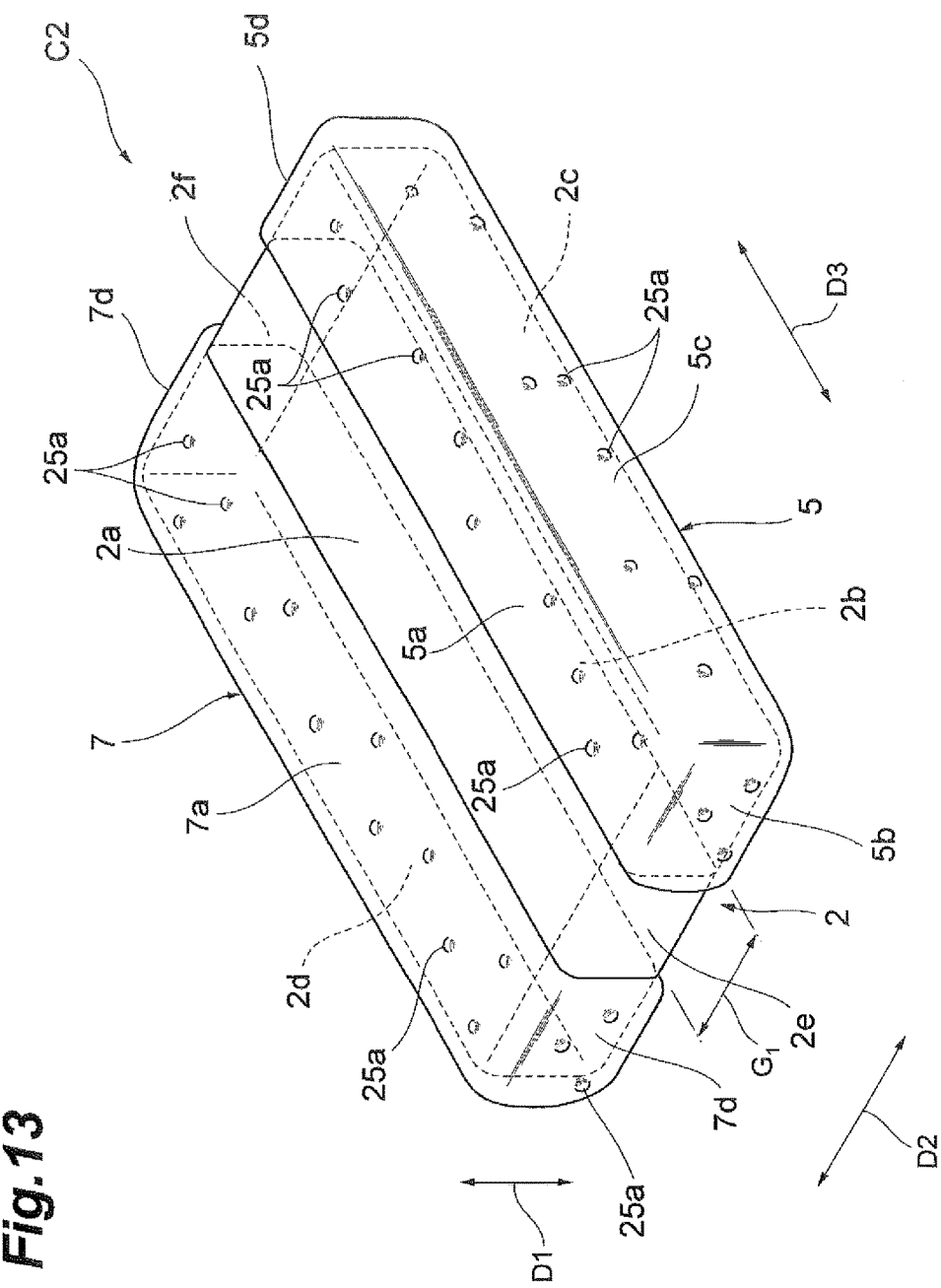
FIG. 13 is a perspective view showing a multilayer capacitor according to a modification example of the embodiment.
Figure 14:
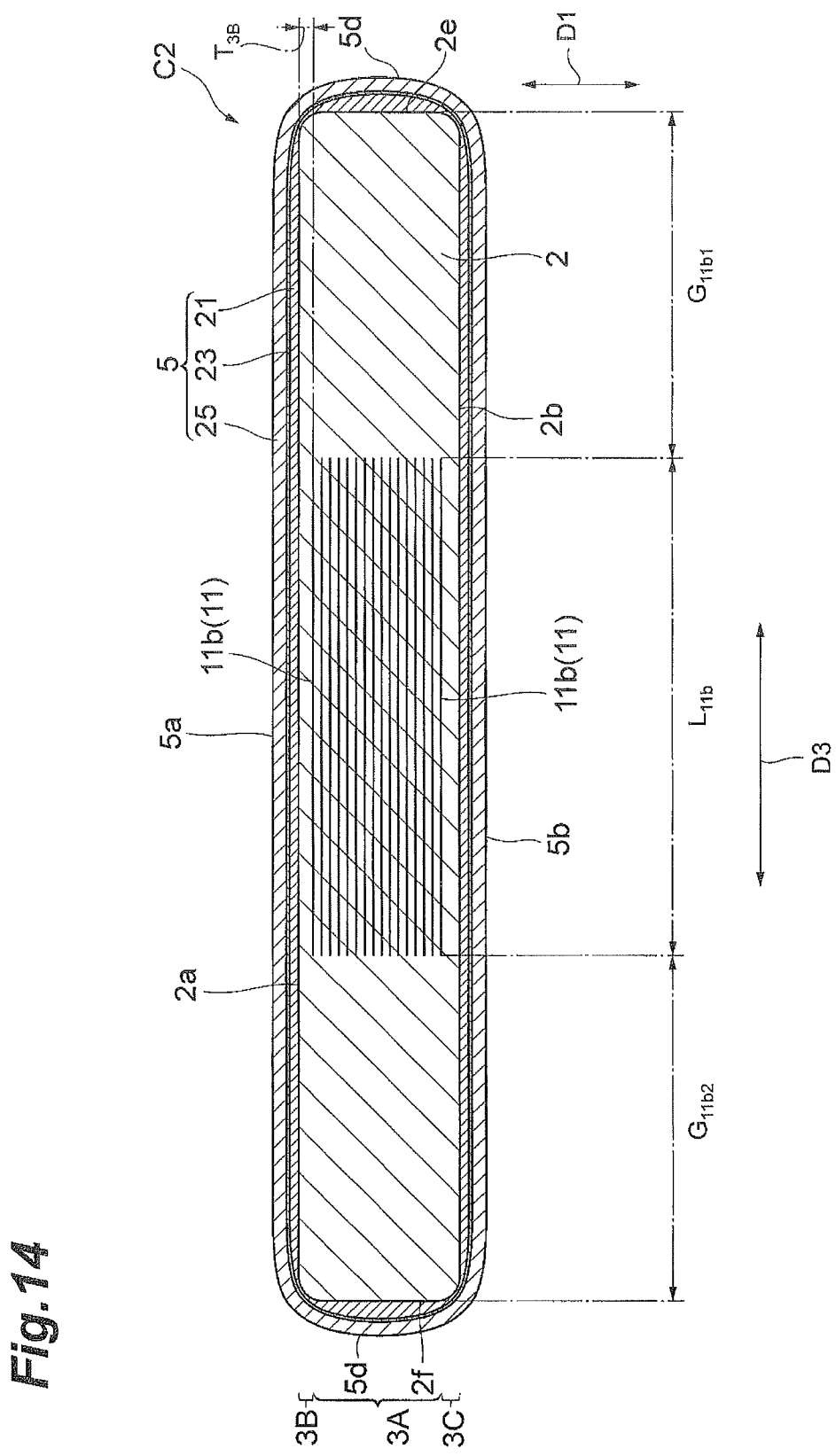
FIG. 14 is a drawing for explaining a cross-sectional configuration of the multilayer capacitor according to the modification example of the embodiment.
Figure 15:
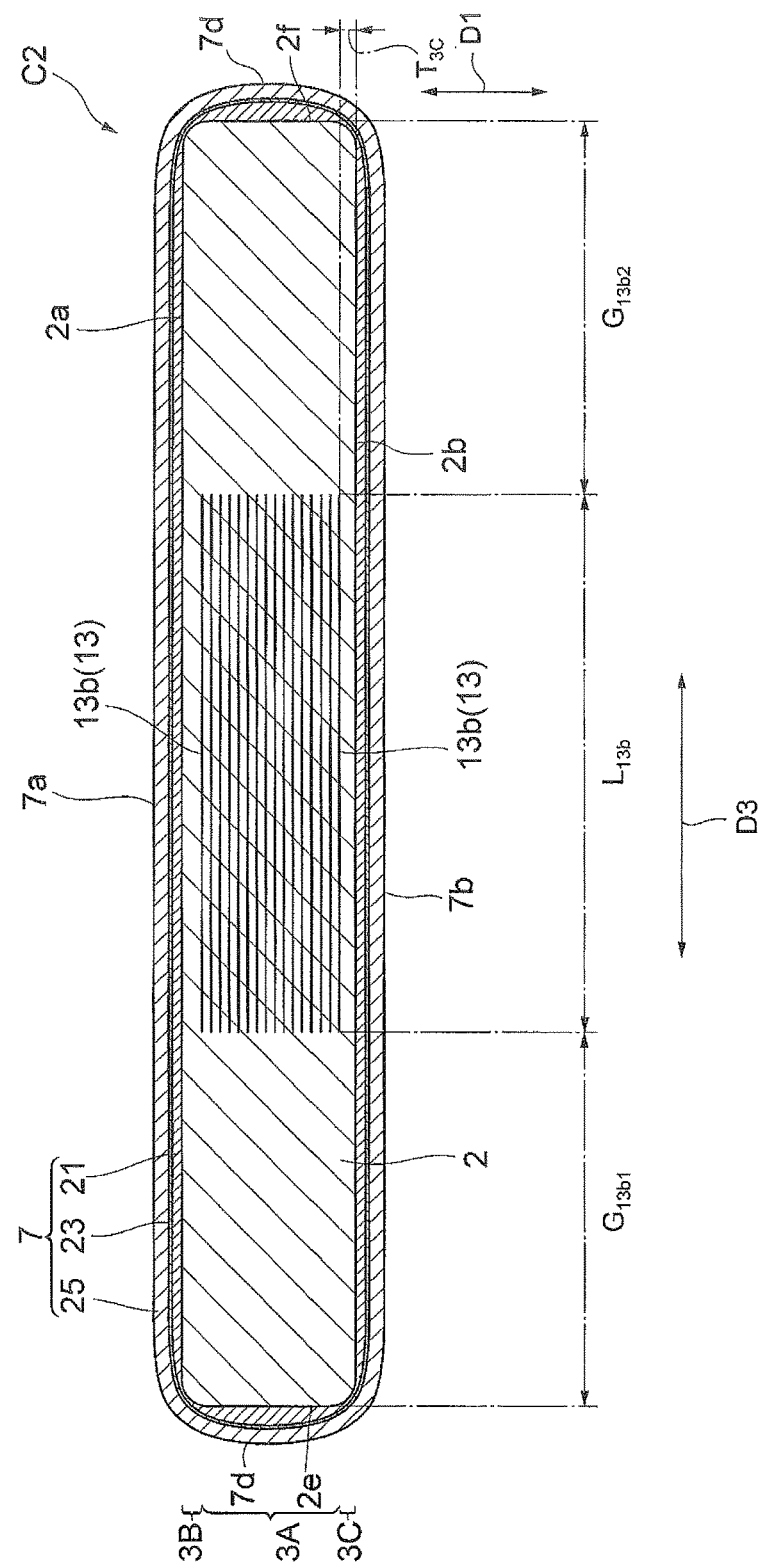
FIG. 15 is a drawing for explaining a cross-sectional configuration of the multilayer capacitor according to the modification example of the embodiment.
Figure 16:
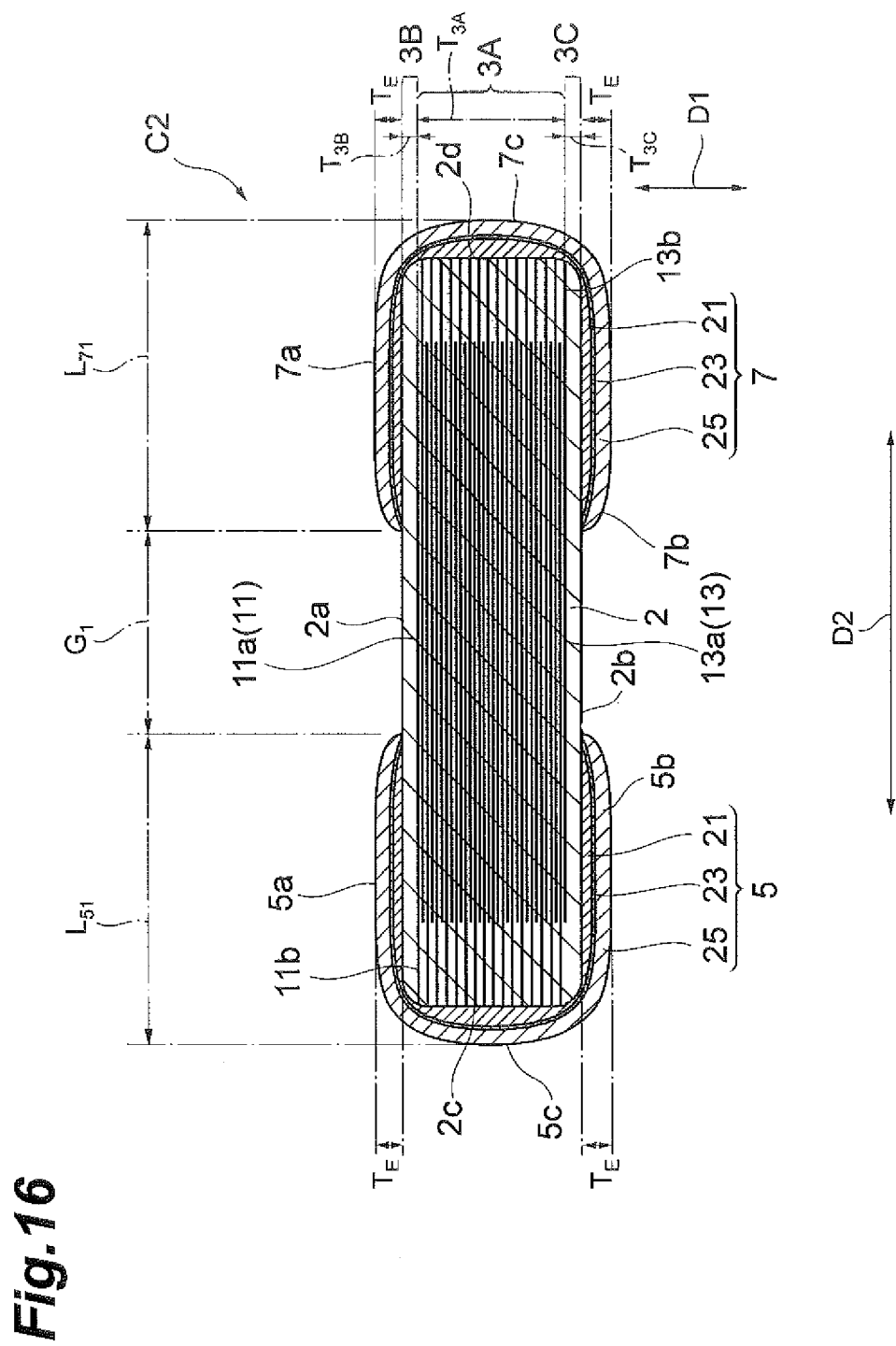
FIG. 16 is a drawing for explaining a cross-sectional configuration of the multilayer capacitor according to the modification example of the embodiment.

Next, a configuration of a multilayer capacitor C2 according to a modification example of the foregoing embodiment will be described with reference to FIGS. 13 to 16. FIG. 13 is a perspective view showing the multilayer capacitor according to the present modification example. FIGS. 14 to 16 are drawings for explaining cross-sectional configurations of the multilayer capacitor according to the present modification example.

The multilayer capacitor C2 includes the element body 2, the first terminal electrode 5 and second terminal electrode 7, the plurality of first internal electrodes 11, and the plurality of second internal electrodes 13.

The length in the first direction D1 of the element body 2, i.e., the length in the height direction of the element body 2 is smaller in the multilayer capacitor C2 than in the multilayer capacitor C1. In the present modification example, the length in the first direction D1 of the element body 2 is smaller than the gap in the second direction D2 between the first terminal electrode 5 and the second terminal electrode 7. That is, the length in the first direction D1 of the element body 2 is smaller than the gap $G_1$. For this reason, the present modification example can achieve further reduction in height of the multilayer capacitor C2 and achieve further reduction in ESL.

The thicknesses $T_{3B}$, $T_{3C}$ of the respective outer layer portions 3B, 3C are smaller than the thickness $T_E$ in the first direction D1 of each electrode portion 5a, 5b, 7a, or 7b. This also allows the present modification example to realize further reduction in height of the multilayer capacitor C2.

As described above, after the multilayer capacitor C2 is built into the substrate, laser processing is preformed to form the via holes in the substrate to reach the first terminal electrode 5 and the second terminal electrode 7. The first terminal electrode 5 and the second terminal electrode 7 are irradiated with a laser beam, and may be damaged by the laser beam. However, since the thickness $T_E$ in the first direction D1 of each electrode portion 5a, 5b, 7a, or 7b is larger than the thicknesses $T_{3B}$, $T_{3C}$ of the respective outer layer portions 3B, 3C, the present modification example can suppress the effect of damage due to the irradiation with the laser beam.

The embodiment of the present invention has been described above, but it should be noted that the present invention is not always limited only to the above-described embodiment but can be modified in many ways without departing from the spirit and scope of the invention.

The first and second terminal electrodes 5, 7 do not always have to include the electrode portions 5a, 7a and the electrode portions 5b, 7b. It is sufficient that the first and second terminal electrodes 5, 7 include at least either of the electrode portions 5a, 7a and the electrode portions 5b, 7b, as electrode portions to be connected to the wiring formed on the substrate.

FIGS. 10 to 12 show the configuration in which the multilayer capacitor C1 is embedded in the substrate 31, but the multilayer capacitor C2 may be mounted as embedded in the substrate 31.

What is claimed is:

1. A multilayer capacitor comprising:
   an element body of a rectangular parallelepiped shape, the element body including a pair of principal surfaces opposing each other in a first direction, a pair of first side surfaces opposing each other in a second direction perpendicular to the first direction, and a pair of second side surfaces opposing each other in a third direction perpendicular to the first and second directions;
   a plurality of first internal electrodes and a plurality of second internal electrodes, the first internal electrodes and the second internal electrodes alternately disposed in the element body to oppose each other in the first direction;
   a first terminal electrode disposed on the element body and connected to the plurality of first internal electrodes; and
   a second terminal electrode disposed on the element body and connected to the plurality of second internal electrodes,
   wherein the element body includes an inner layer portion and a pair of outer layer portions, the inner layer portion being located between the pair of outer layer portions in the first direction, the plurality of first internal electrodes and the plurality of second internal electrodes being located in the inner layer portion, wherein a length in the first direction of the element body is smaller than a length in the second direction of the element body and smaller than a length in the third direction of the element body, wherein the first terminal electrode includes a first electrode portion disposed on one of the pair of the principal surfaces and a second electrode portion disposed on one of the pair of the first side surfaces, wherein the second terminal electrode includes a third electrode portion disposed on the one of the pair of the principal surfaces and a fourth electrode portion disposed on the other of the pair of first side surfaces, the third electrode portion being separated from the first electrode portion in the second direction on the one of the pair of the principal surfaces, wherein each of the first internal electrodes includes a first main electrode portion, and a first connection portion connecting the first main electrode portion and the second electrode portion, the first connection portion being exposed at the one of the pair of the first side surfaces, wherein each of the second internal electrodes includes a second main electrode portion, and a second connection portion connecting the second main electrode portion and the fourth electrode portion, the second main electrode portion opposing the first main electrode portion in the first direction, the second connection portion being exposed at the other one of the pair of the first side surfaces, wherein a length in the third direction of the first connection portion is smaller than a length in the third direction of the first main electrode portion, wherein a length in the third direction of the second connection portion is smaller than a length in the third direction of the second main electrode portion, wherein a thickness in the first direction of the inner layer portion is smaller than each of the length in the third direction of the first connection portion and the length in the third direction of the second connection portion and smaller than each of a gap from any of the pair of the second side surfaces to the first connection portion in the third direction and a gap from any of the pair of the second side surfaces to the second connection portion in the third direction, and wherein a length in the second direction of the first electrode portion and a length in the second direction of the third electrode portion are greater than a gap between the first electrode portion and the third electrode in the second direction.

2. The multilayer capacitor according to claim 1, wherein the length in the third direction of the first connection portion is smaller than a total value of a gap from the one of the second side surfaces to the first connection portion in the third direction and a gap from the other of the second side surfaces to the first connection portion in the third direction, and wherein the length in the third direction of the second connection portion is smaller than a total value of a gap from the one of the second side surfaces to the second connection portion in the third direction and a gap from the other of the second side surfaces to the second connection portion in the third direction.

3. The multilayer capacitor according to claim 2, wherein the length in the third direction of the first connection portion is smaller than the gap from the second side surface to the first connection portion in the third direction, and wherein the length in the third direction of the second connection portion is smaller than the gap from the second side surface to the second connection portion in the third direction.

4. The multilayer capacitor according to claim 1, wherein the length in the first direction of the element body is smaller than each of the length in the third direction of the first connection portion and the length in the third direction of the second connection portion and smaller than each of the gap from the second side surface to the first connection portion in the third direction and the gap from the second side surface to the second connection portion in the third direction.

5. The multilayer capacitor according to claim 1, wherein the length in the first direction of the element body is smaller than a gap between the first electrode portion and the third electrode portion in the second direction.

6. The multilayer capacitor according to claim 1, wherein the length in the third direction of the element body is larger than the length in the second direction of the element body.

7. The multilayer capacitor according to claim 1, wherein each of the first terminal electrode and the second terminal electrode includes a sintered conductor layer formed on the element body, a first plated layer formed on the sintered conductor layer, and a second plated layer formed on the first plated layer, wherein the sintered conductor layer contains Cu or Ni, the first plated layer contains Ni or Sn, and the second plated layer contains Cu or Au.

8. The multilayer capacitor according to claim 7, wherein the second plated layer is a Cu-plated layer, and wherein projections being made of Cu are formed on a surface of the Cu-plated layer.

9. The multilayer capacitor according to claim 1, wherein a thickness in the first direction of each of the outer layer potions is smaller than a thickness in the first direction of the first electrode portion and smaller than a thickness in the first direction of the third electrode portion.

* * * * *